March 22, 1966 R. F. STALLMAN 3,241,890
RECIRCULATING BEARING
Filed Oct. 7, 1963 2 Sheets-Sheet 1

INVENTOR.
RALPH F. STALLMAN
BY George B. White
ATTORNEY

March 22, 1966  R. F. STALLMAN  3,241,890
RECIRCULATING BEARING
Filed Oct. 7, 1963  2 Sheets-Sheet 2
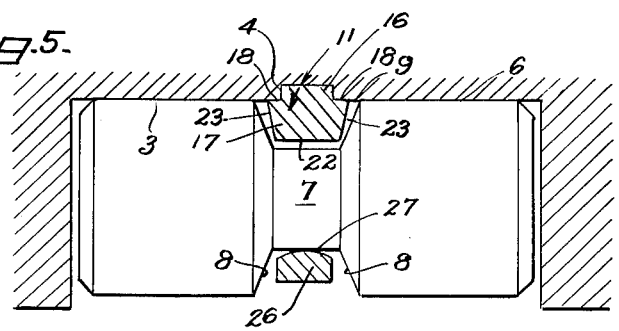
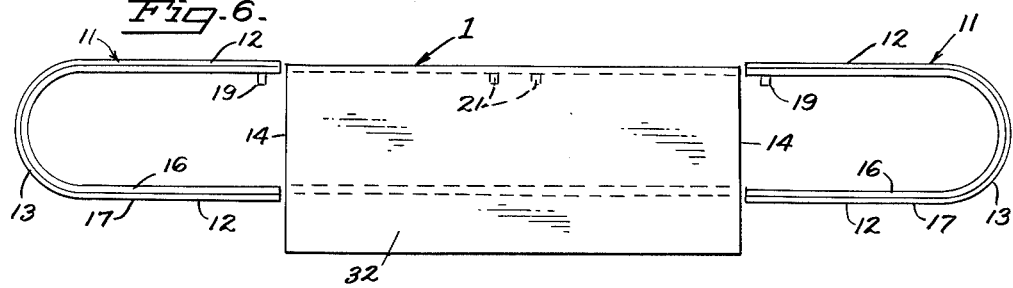
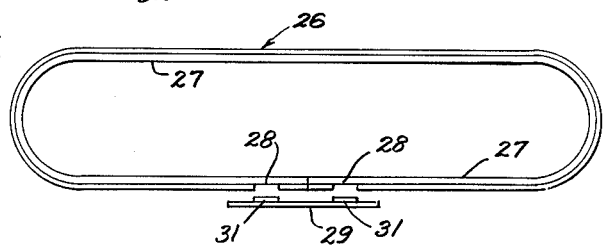
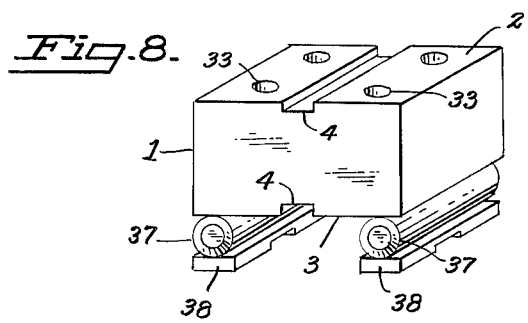
INVENTOR.
RALPH F. STALLMAN
BY *George B White*
ATTORNEY

United States Patent Office 3,241,890
Patented Mar. 22, 1966

3,241,890
RECIRCULATING BEARING
Ralph F. Stallman, 4800 Reinhardt Drive, Oakland, Calif.
Filed Oct. 7, 1963, Ser. No. 314,238
4 Claims. (Cl. 308—6)

This invention relates to a recirculating bearing.

In the performance of way bearings, particularly in machine tools where the loads are heavy and accuracy is of most importance, skewing of the rollers or the tendency of rollers to go off axis in relation to their direction of travel, is an acute problem. Springing of parts, sliding and heavy friction in the machines result in erratic motion, power loss and early fatigue of the parts. Several means have been used to overcome these faults but the improvement is so slight as to be considered non-existent.

One reason for failure to remedy said faults is that present designs provide for correction of skewing in the load zone only, the other free zones having no means of holding the rollers on true axis in direction of their travel. Rollers off axis, on entering the load zone roll through without sufficient turns of the roller or sufficient length of the flat race to bring about the necessary correction. On leaving the load zone when the rollers are skewed they continue to hold skewed through the free zone and again enter the load zone in a skewed position; hence, with present designs problems of a destructive nature assert themselves.

The principal feature of the new design is to provide a continuous guide rail to correct in the entire travel and hence not permit the rollers to go off axis at any time. When the rollers enter the load zone on axis, the rollers run free and the bearing is stable and the friction is low.

Another purpose is to provide a continuous retaining ring to contact the neck or reduced middle portion of the roller, not on its sides but at its bottom or smallest diameter, so the guide rail, working on the sides of the reduced portion of the roller to correct skewing and the retainer working on the bottom thereof work in harmony in preventing cramping of the rollers thus permitting them to function properly to avoid setting up a counter action which might detract from the function of the guide rail.

Another purpose is the simplicity of the parts of such bearings, namely a minimum of operations in the manufacture of the raceway, and guide rails and retainer of simple rolled wire forms.

Another purpose is a bearing easy to disassemble for renewal of worn or broken parts, and for economical replacement.

Another purpose is the use of a central tie plate to tie the ends of the retainer ring or band together and also to embrace the raceway in a manner to prevent endwise motion of the retainer band in relation to the guide rails and also an undercut in the raceway to receive the sides of the tie plate to prevent it from falling out during shipment or handling.

Another purpose is to have an open or skeleton construction at each end of the roller path to provide a means of escapement of any dirt or chips which might foul the rollers in their travel.

Another purpose is to shorten the overall length of the bearing in relation to its working surface and permit close-coupled tandem operation.

Another purpose is to provide a means of cushioning or springing the unit under extreme shock loads or under uneven foundation, especially when the unit is used as a reaction or snubbing bearing in companionship with or opposing a solidly mounted unit.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 5 is an enlarged cross-sectional view of the bearing showing the relative positions of the guide rail and of the retaining band.

FIG. 6 is a developed detail view of the body of the bearing with the guide rail sections detached.

FIG. 7 is a detail view of the retaining band with the tie plate detached.

FIG. 8 is a perspective view of a modified form of the body of the bearing.

Figure 1:
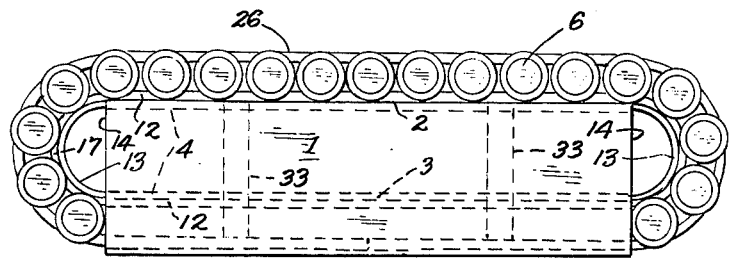
FIG. 1 is a side view of the circulating bearing.
Figure 2:
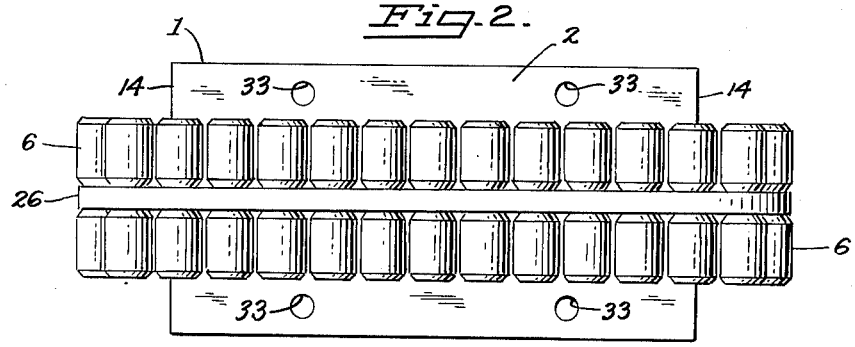
FIG. 2 is a top plan view of the circulating bearing.
Figure 3:
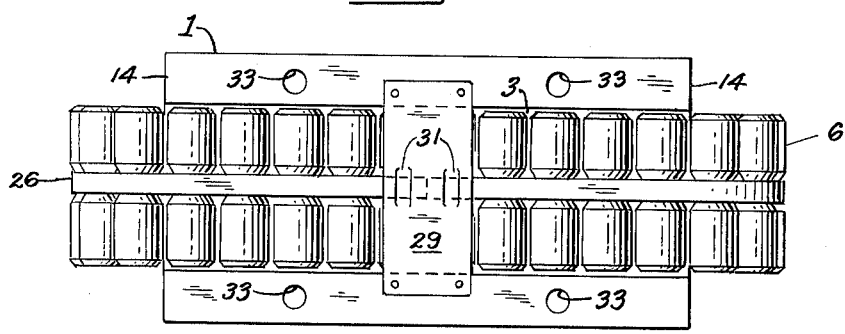
FIG. 3 is a bottom plan view of the circulating bearing.

The bearing herein is formed on a body 1, which has a pair of opposite substantially parallel races 2 and 3. In each race is formed a longitudinal groove 4 extending the entire length of the respective race 2 or 3. Race 2 herein is the so called load zone on which the rollers 6 bear the load during relative movement.

This bearing makes use of a series of rollers 6 in contact with one another. Each roller has an annular reduced portion or neck 7 in its middle. The sides 8 of the annular recess 9 formed around the reduced neck 7 are inclined inwardly of the recess 9 and to said neck 7 so that each side 8 is frusto-conical and convex with respect to said annular recess 9.

A guide rail 11 is made in two symmetrical complemental longitudinal half sections. Each rail section is generally U shaped and has parallel portions 12 fitting over and projecting beyond the ends of the respective races 2 and 3 and a generally semi-circular connecting portion 13 spaced from the flat ends 14 of the body 1.

The cross-sectional shape of the rail 11, as shown in FIG. 5, includes a base strip 16 and a guide strip 17, which latter is wider than the base strip 16 as to form shoulders 18 resting on the respective flat races 2 and 3 along the opposite edges of the grooves 4. The base strips 16 fit into the grooves 4. On the sides fitting the load zone race 2 the ends of the base strips 16 have locating prongs 19 engageable with holes 21 in the bottom of the groove 4, so as to locate the respective guide rail sections contiguously in said grooves 4 and thus form a continuous guide rail 11 projecting beyond the ends of the races 2 and 3 and beyond the body, thereby to form the guide or base of an exposed or open skeleton support for the rollers 6 at each end of the bearing.

The distance or thickness of the guide strip 17 from the shoulders 18 to its inner surface or periphery 22 is less than the depth of the annular recess 9 so that the guide strip periphery 22 never touches the reduced neck 7. The sides 23 of the guide strip 17 are inclined and converge at a smaller included angle than the included inclined angle of the frusto-conical sides 8 of the annual recess 9 so that when the rollers skew in either direction the frusto-conical side 8 which is advanced by skewing contacts the portion of the guide rail side 23 nearest to the neck 7, thus exerts more effective leverage for retarding the advanced side of the roller and for correcting the skewing.

A retaining band 26 is spaced from and is parallel with the guide rail 11 and forms the outer member of the open skeleton frame beyond each end of the body 1. The retaining band 26 is narrower than the width of the neck 7 and is spaced from the frusto-conical sides 8 at a sufficient distance to prevent any contact between the retainer band 26 and the frusto-conical sides 8 even at the extreme skewing of the rollers 6. The thickness of the retainer band 26 and the spacing of the band 26 from the guide rail 11 is such that the inner surface or periphery 27 of the retainer band 26 is in contact with the neck 7. The engagement of the neck 7 by the inner surface 27 of the band 26 coacts with the engagement of the respective frusto-conical side 8 with the adjacent guide rail side 23 to correct skewing of the roller 6.

The retainer band 26 is a continuous band one side of which is split in the middle so that it can be easily snapped into position. There is a hole 28 in each end at the split of the band 26. A tie plate 29 has bosses 31 thereon fitting into said holes 28 for tying the ends of the band 28 together from the outside without interfering with the engagement of the band with the reduced neck 7 of the rollers 6.

Figure 4:
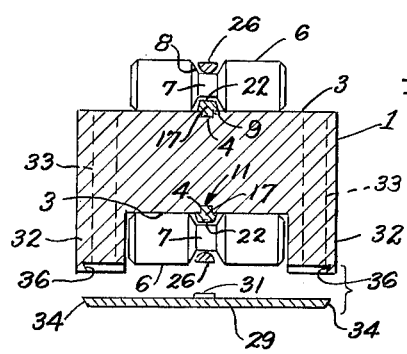
FIG. 4 is a cross-sectional view of the bearing with the tie plate detached.

On the side of the body 1 which is attached to a machine part there is provided means to space and mount the body 1 fixedly in place. In the form shown in FIG. 4, a pair of longitudinal flanges 32 extend from the edges of the race 3 to a distance to permit free rolling of the rollers 6 on their return toward the load zone. Suitable means such as bolts extended through bolt holes 33 mount the body 1 in place.

The tie plate 29 has tapered transverse ends 34 which can be inserted in corresponding tapered notches 36 in the ends of the respective flanges 32. The tie plate 29 is comparatively thin and sufficiently resilient to be snapped into tying position.

In some installations stiff cushioning for the bearing is desirable. In the form shown in FIG. 8, instead of flanges a pair of spaced steel tubes 37 are arranged longitudinally along the edges of the return race 3 and a flat plate is provided on each tube 37 to be flat against the surface on which the bearing is mounted. Suitable bolts extended through the body 1, the tubes 37 and the flat plates 38 securely mount the bearing.

I claim:
1. In a recirculating bearing,
   (a) an elongated body having generally parallel flat races extending from end to end on the opposite faces of said body,
   (b) a continuous guide rail secured to said faces, and extending longitudinally along the middle of said flat races and projecting beyond the ends of said flat races, the portions of said guide rail projecting beyond the ends of said body forming a curved guide at each end from one race to the other,
   (c) a series of rollers in side by side arrangement rolling on said flat races and around said projecting curved portions of said guide rail, each roller having an annular recess formed in its middle located over said guide rail,
   (d) a continuous retaining band formed parallel with and spaced from said guide rail around said flat races and around said curved projections to form an open skeleton support within the annular recesses of the rollers beyond each end of said elongated body whereby said rollers ride freely around the ends of said body between said guide rail and said band,
   (e) said guide rail being normally spaced from the sides and bottom of said annular recesses of said rollers,
   (f) said retaining band being spaced from the sides of said annular recesses of said rollers and engaging the bottoms of said annular recesses, thereby to retain said rollers on said body and being thinner than the depth of said recesses,
   (g) the sides of said guide rail and of said annular recesses on said rollers being inclined for engagement only during the skewing of a roller thereby to correct said skewing,
   (h) said retainer band being narrower than said guide rail, whereby the sides of said band remain spaced from the sides of said annular recess during the skewing of said rollers and during the contact of the sides of said annular recesses with the sides of said guide rail.
   (i) and spacing means on said body adjacent one of said flat faces to space said rollers from the surface on which said body is mounted.
2. The improvement defined in claim 1, and
   (j) means to anchor said band on said body against relative movement.
3. The improvement defined in claim 1, and
   (j) the sides of said annular recess converging at a larger included angle than the included angle of convergence of the adjacent inclined sides of said guide rail thereby to contact the respective guide rail sides at a portion of the inclined recess side nearer to the bottom of said recess for straightening the respective roller from a skewed attitude.
4. The improvement defined in claim 3, and
   (k) said guide rail being anchored to said body against relative movement,
   (l) and means to anchor said band to said spacing means against movement relatively to said body.

References Cited by the Examiner

UNITED STATES PATENTS

| 1,275,715 | 8/1918 | Makutchan | 308—214 |
| 2,049,394 | 7/1936 | Johnson. | |
| 2,334,227 | 11/1943 | Stallman | 308—312 |
| 2,930,481 | 3/1960 | Bebie | 108—51 X |
| 2,995,908 | 8/1961 | Mazziotti | 64—23 |
| 3,003,828 | 10/1961 | Stark | 308—6 |
| 3,101,978 | 8/1963 | Stallman | 308—6 |

FOREIGN PATENTS 756,333  12/1933  France.

DAVID J. WILLIAMOWSKY, *Primary Examiner.*

DON A. WAITE, *Examiner.*

L. L. JOHNSON, *Assistant Examiner.*